(12) United States Patent
Sakoda

(10) Patent No.: US 7,061,888 B2
(45) Date of Patent: Jun. 13, 2006

(54) COMMUNICATION METHOD AND APPARATUS IN WHICH A TOTAL POWER OF POWER CONTROL INFORMATION IS A FIXED VALUED

(75) Inventor: Kazuyuki Sakoda, Tokyo (JP)

(73) Assignee: Sony Corporation (JP)

( * ) Notice: Subject to any disclaimer, the term of this patent is extended or adjusted under 35 U.S.C. 154(b) by 891 days.

(21) Appl. No.: 09/798,624

(22) Filed: Mar. 2, 2001

(65) Prior Publication Data

US 2002/0075829 A1    Jun. 20, 2002

(30) Foreign Application Priority Data

Mar. 3, 2000   (JP) ............................ P2000-059028
May 11, 2000   (JP) ............................ P2000-139044

(51) Int. Cl.
  *H04Q 7/00*   (2006.01)
  *H04B 7/216*  (2006.01)

(52) U.S. Cl. .................. 370/332; 370/342; 370/318; 370/335; 370/441; 455/522

(58) Field of Classification Search ................ 370/335, 370/342, 318, 332; 455/522
See application file for complete search history.

(56) References Cited

U.S. PATENT DOCUMENTS

| | | | | |
|---|---|---|---|---|
| 5,566,165 A | * | 10/1996 | Sawahashi et al. | ......... 370/342 |
| 5,604,730 A | * | 2/1997  | Tiedemann, Jr. | ............ 370/252 |
| 5,623,486 A | * | 4/1997  | Dohi et al. | .................. 370/342 |
| 6,307,844 B1 | * | 10/2001 | Tsunehara et al. | .......... 370/318 |
| 6,385,183 B1 | * | 5/2002 | Takeo | .......................... 370/335 |
| 6,438,387 B1 | * | 8/2002 | Ichikawa | ..................... 455/522 |
| 6,603,746 B1 | * | 8/2003 | Larijani et al. | ............. 370/318 |
| 2001/0046219 A1 | * | 11/2001 | Kitade et al. | ................ 370/332 |
| 2002/0064135 A1 | * | 5/2002 | Chen et al. | ................. 370/252 |
| 2002/0094835 A1 | * | 7/2002 | Hayashi et al. | ............. 455/522 |
| 2005/0083869 A1 | * | 4/2005 | Takahashi et al. | .......... 370/318 |

* cited by examiner

*Primary Examiner*—Ricky Q. Ngo
*Assistant Examiner*—Feben Micael Haile
(74) *Attorney, Agent, or Firm*—Lerner, David, Littenberg, Krumholz & Mentlik, LLP

(57) ABSTRACT

When a base station and a plurality of terminal stations communicate with each other by radio, reception situations of signals transmitted from a base station are measured by respective terminal stations and measured information is transmitted to the base station. When the base station adaptively sets processing of signals transmitted to the respective terminal stations based on the transmitted information and multiplexes and transmits, from the base station to a plurality of terminal stations, power control information (RPC) for instructing electric power of signals transmitted from the respective terminal stations to the base station, transmission energy to individual terminal stations are set adaptively and transmission electric power at the respective terminal stations are set based on the power control information. Thus, information such as power control information that should individually instructed to the respective terminal stations can satisfactorily be transmitted to all terminal stations by a simple arrangement and simple processing.

15 Claims, 10 Drawing Sheets

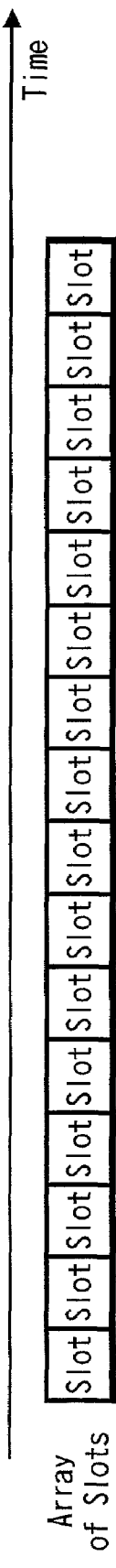
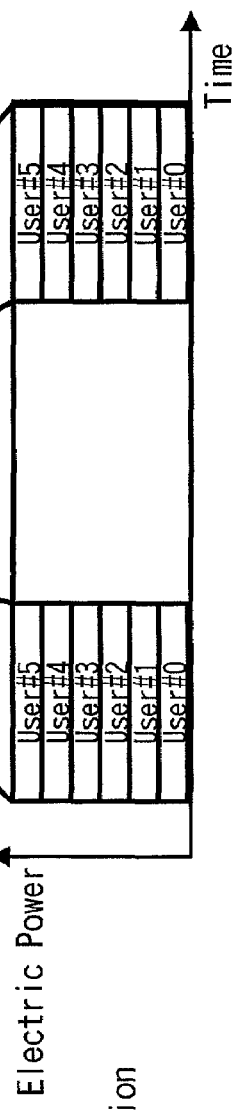
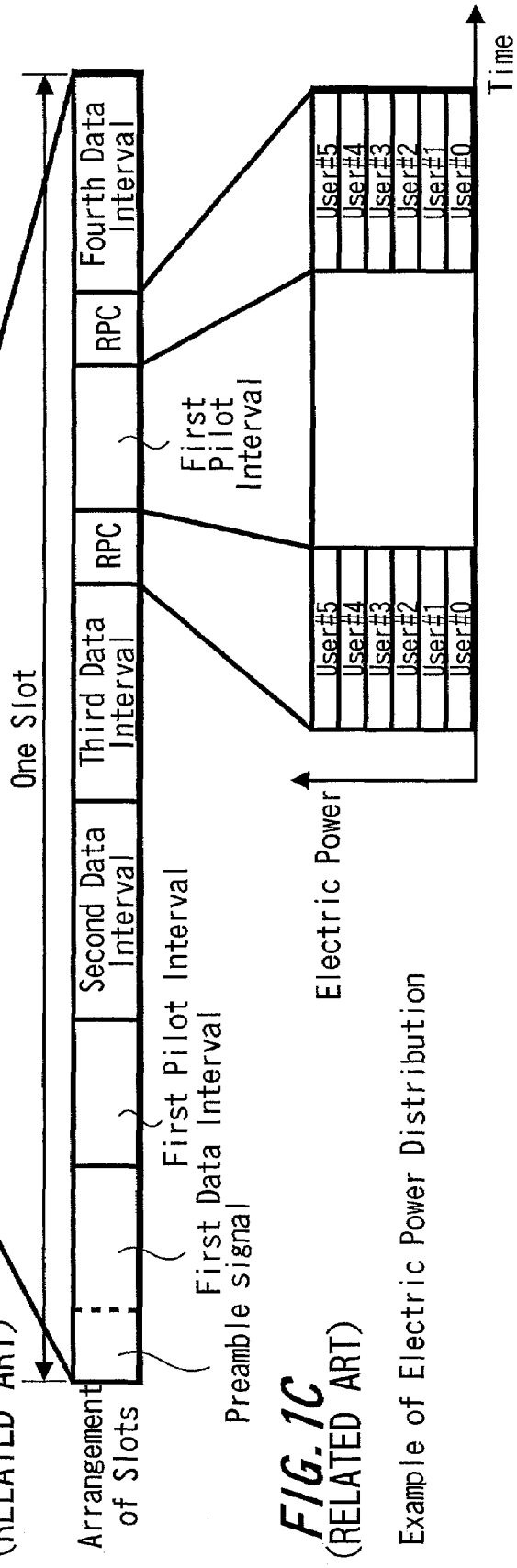
FIG. 1A (RELATED ART)
Array of Slots
FIG. 1B (RELATED ART)
Arrangement of Slots
FIG. 1C (RELATED ART)
Example of Electric Power Distribution

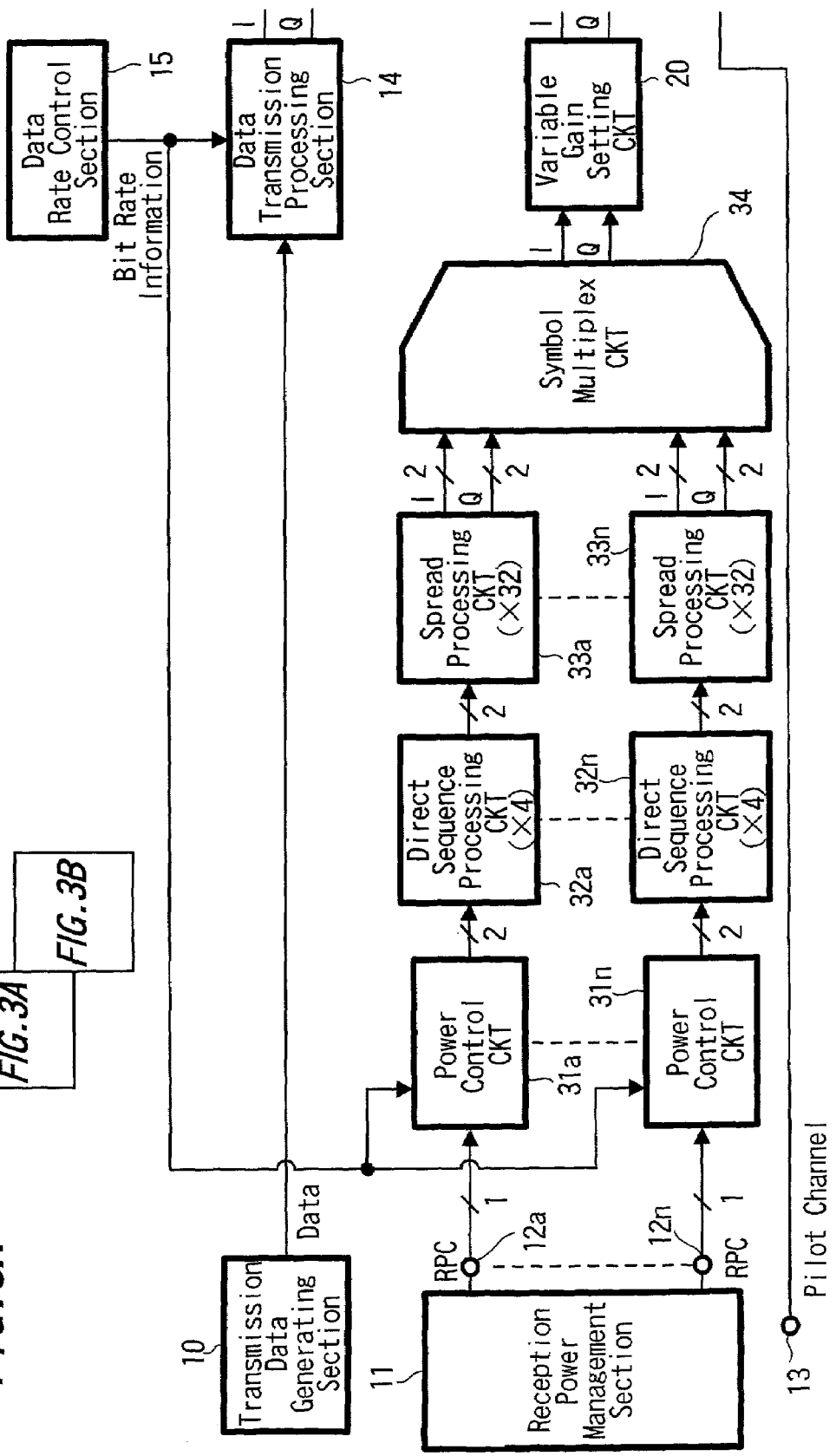

A Portion of Slot Arrangement

Example of Electric Power Distribution

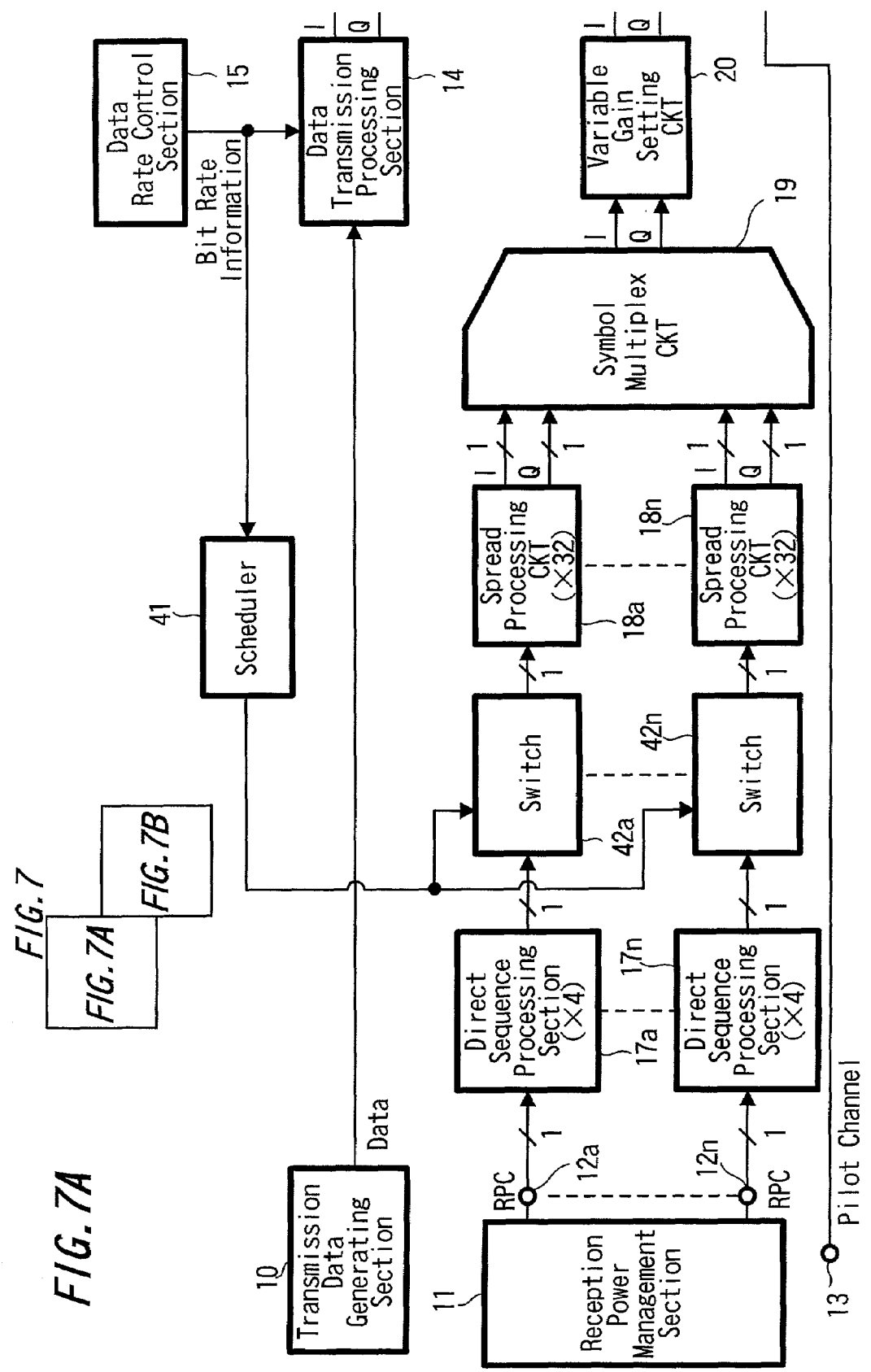

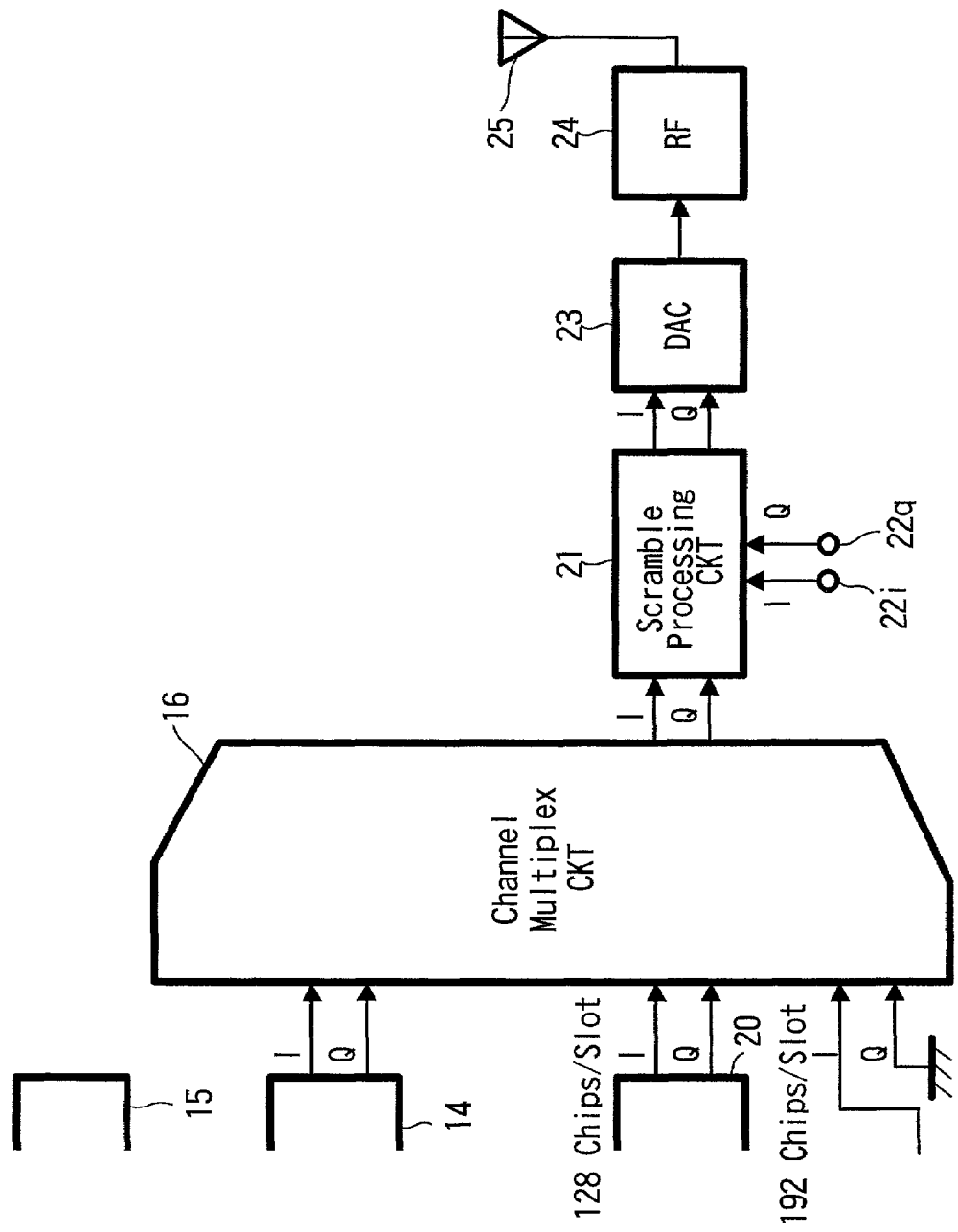

A Portion of Slot Arrangement

Example of Electric Power Distribution

A Portion of Slot Arrangement

Example of Electric Power Distribution

COMMUNICATION METHOD AND APPARATUS IN WHICH A TOTAL POWER OF POWER CONTROL INFORMATION IS A FIXED VALUED

BACKGROUND OF THE INVENTION

1. Field of the Invention

The present invention generally relates to a communication system and a communication method suitably used for a cellular wireless communication system and a communication apparatus used by a base station of this communication system. More particularly, this invention relates to a communication system, a communication method and a communication apparatus suitable for use in a system which transmits a CDMA (code division multiple access) signal by radio, for example.

2. Description of the Related Art

A proposed digital cellular wireless communication system for effecting a data communication between a base station and a plurality of terminal stations transmits down-link data from a base station to terminal stations with a frame arrangement shown in FIGS. 1A and 1B. This digital cellular wireless communication system shows an example of a transmission arrangement of a system called an HDR (high data rate). FIG. 1A is a diagram showing a frame arrangement in which slots that are divided at every unit length are located continuously. FIG. 1B shows an arrangement of one slot in which there are disposed a first data interval, a first pilot interval, a second data interval, a third data interval, a first power control information interval, a second pilot interval, a second power control information interval and a fourth data interval, in that order. In FIG. 1B, each power control information interval is shown as an "RPC" for simplicity.

As shown in FIG. 1B, a preamble signal is disposed at a part of the starting portion of the first data interval. Data within the preamble signal indicates a terminal station to which the data within the slot is transmitted. The first to fourth data intervals are set to be the same duration. To be concrete, the first to fourth data intervals are respectively set to be 464 chips, the first and second pilot intervals are respectively set to be 96 chips, the first and second power control information intervals are set to be 64 chips, respectively, and the length of one slot is set to be 2176 chips, for example.

In the case of this digital cellular wireless communication system, a data interval within one slot is allocated as an interval for transmitting data to one terminal station. Accordingly, when data should be transmitted from the base station to a plurality of specific terminal stations, a plurality of terminal stations, for example, transmit data by sequentially using one slot each. The power control information intervals (RPC) located ahead of and behind the second pilot interval individually transmit power control information to respective terminal stations which are communicating with the base station. This power control information is data for designating a transmission electric power of an up-link through which data is transmitted from each terminal station to the base station and instructs individual terminal stations either to increase a transmission electric power or to decrease a transmission electric power.

In order to simultaneously and individually transmit the power control information to individual terminal stations, in the proposed system according to the related art, power control information for each terminal station is spread by using a code allocated at every terminal station and the power control information thus spread for each terminal station are multiplexed and then transmitted. The processing in which a plurality of data thus spread by using the code corresponds to a CDMA (code division multiple access) system processing.

FIG. 1C is a diagram showing the manner in which power control information is transmitted in the first and second power control information intervals. In this example, power control information is simultaneously transmitted to six terminal stations of users #0 to #5, and power control information for six terminal stations are held at the same transmission electric power, spread, multiplexed and then transmitted.

Transmission electric powers of all signals transmitted from the base station during each slot period are set to the same value (fixed value), and the total transmission electric power of the power control information transmitted during the first and second power control information intervals also is set to be this fixed value. Accordingly, as shown in FIG. 1C, for example, when the power control information is simultaneously transmitted to the six terminal stations, a transmission electric power of each power control information becomes ⅙ of the fixed value. While the power control information to the six users #0 to #5 are illustrated in the state that they are simply added for simplicity in the example shown in FIG. 1C, in actual practice, the power control information that had been spread by using the code is added.

In the case of this digital cellular wireless communication system, a modulation system and a coding ratio of data transmitted from the base station during the data interval are adaptively set in response to the communication state between the base station and the terminal station of the called party so that even the arrangement in which the transmission electric power is set to the fixed value as described above can cope with the change of the wireless communication state between the base station and the terminal station.

FIG. 2 (formed of FIGS. 2A and 2B drawn on two sheets of drawings so as to permit a use of a suitably large-scale) is a block diagram showing an example of an arrangement of a transmission system of a base station for transmitting data to each terminal station with the arrangement of the frame shown in FIGS. 1A and 1B, for example. As shown in FIG. 2, there is provided a transmission data generating section 10 which is a circuit for generating data transmitted to a terminal station. A reception power management section 11 is a circuit for generating power control information transmitted to the terminal stations. Power control information to individual terminal stations are supplied to individual terminals (these terminals will hereinafter be referred to as "power control information input terminals") 12a to 12n. A pilot channel input terminal 13 is a terminal to which pilot data is supplied from a pilot data setting circuit (not shown).

Transmission data generated from the transmission data generating section 10 is supplied to a data transmission processing section 14, in which it is processed for transmission such as transmission coding processing, modulation processing and interleave processing. The data processed herein is data located in the first to fourth data intervals of the slot arrangement shown in FIGS. 1A and 1B, and the preamble data located at the starting portion of the first data interval also is processed. Since data located in the first to fourth data intervals are fundamentally located to one terminal station at the unit of slots as earlier noted, during a period in which data of one slot is processed, the coding system and the modulation system suited for the terminal station for effecting a communication in that slot are set by the data transmission processing section 14 and the transmission processing is executed.

The coding system and the modulation system suitable for the terminal station are set based on bit rate information supplied from a data rate control section 15 to the data transmission processing section 14. To be concrete, when data which is to be transmitted to a terminal station of which communication state (receiving situation at the terminal station) is satisfactory is transmitted, transmission data is coded by a multivalued modulation such as a 16QAM (16-quadrature amplitude modulation) and high coding rate and then transmitted at a high throughput. When transmission data which is to be transmitted to a terminal station whose communication state is not satisfactory is transmitted, transmission data is coded by a low coding rate and a QPSK (quadrature phase shift keying)-modulated signal is spread or transmitted a plurality of times and thereby transmitted at a low throughput. Transmission data (I-channel data and Q-channel data) that had been processed by the data transmission processing section 14 are supplied to a channel multiplex circuit 16.

Power control information supplied to the power control information input terminals 12a to 12n are information prepared individually at a plurality of terminal stations with which the base station communicate at the same period, and individual information are separately supplied to the power control information input terminals 12a to 12n at every terminal station. Accordingly, power control information are generated and supplied in response to the number of terminal stations which communicate with the base station at the same period. Power control information supplied to one terminal station is 1-bit information per slot. Such 1-bit information is used to instruct the corresponding terminal station to increase a transmission electric power or to decrease a transmission electric power.

Respective power control information applied to the power control information input terminals 12a to 12n are supplied to direct sequence sections 17a to 17n, in which each 1-bit data is broken into four-times data, i.e., 4-bit data in which 1-bit data is repeated four times. The 4-bit power control information per slot are respectively supplied to respective spread processing circuits 18a to 18n, in which they are spread and modulated into data having a predetermined-time bit rate (bit rate of 32 times) by using a predetermined code (e.g., Walsh Code) set at every terminal station and thereby I-channel power control information and Q-channel power control information are obtained. Since the 4-bit data is spread by 32 times, there may be obtained data having a data rate of 128 chips/slot.

The data spread and modulated by the respective spread processing circuits 18a to 18n are supplied to a symbol multiplex circuit 19, in which they are mixed as signals of one system. The signals thus mixed are supplied to a variable gain setting circuit 20. The variable gain setting circuit 20 adjusts the gains of the multiplexed power control information such that the gains may become constant values. Specifically, in the case of this example, the gain of the signal transmitted from the base station is a previously-determined constant value. The number of data which are multiplexed by the symbol multiplex circuit 19 is changed in response to the number of terminal stations which are communicating with the base station at that time. Therefore, in response to the number of data multiplexed by the symbol multiplex circuit 19, the variable gain setting circuit 20 generates a signal having a constant gain by adjusting the gain of the transmission signal. The signals whose gain had been adjusted by the variable gain setting circuit 20 are supplied to a channel multiplex circuit 16.

Pilot data applied to the pilot channel input terminal 13 are all null data and hence supplied to the channel multiplex circuit 16 as they are.

The channel multiplex circuit 16 multiplexes the respective signals supplied thereto in a time-division manner such that the slot arrangement shown in FIG. 1B may be obtained. The signals thus multiplexed in a time-division manner by the channel multiplex circuit 16 are supplied to a scramble processing circuit 21. The scramble processing circuit 21 is supplied with spread codes of both I-channel and Q-channel from terminals 22i, 22q and spreads data by using these spread codes. The spread transmission signals of I-channel and Q-channel are supplied to a digital-to-analog (D/A) converter 23, in which they are converted from digital data into analog data. The analog transmission signal is supplied to a high-frequency (radio-frequency) circuit 24, in which it is processed as a high-frequency signal and thereby converted into a signal having a predetermined transmission frequency channel. Then, the signal having the converted transmission frequency is supplied to an antenna 25, from which it is transmitted to each terminal station by radio.

Since the transmission signal is transmitted from the base station to each terminal station as described above, the base station is able to individually communicate with respective terminal stations at the unit of slots and is able to simultaneously transmit the power control information for instructing the transmission state of each terminal station to all terminal stations at every slot. With respect to the wireless transmission of down-link information from each terminal station to the base station, the transmission electric power can properly be set based on the power control information transmitted from the base station and the base station can satisfactorily receive the signal from each terminal station. With respect to the wireless transmission of down-link information from the base station to each terminal station, since the coding ratio and the modulation system are set adaptively although the transmission power is fixed to the constant value, the transmission signal can be satisfactorily received by any terminal station. Specifically, if each terminal station is a mobile station, then although a distance or a communication state between each terminal station and the base station is changed at any time, the above processing is effected on the transmission signals of up-link information and down-link information respectively, whereby the transmission processing following the change of the distance or the communication state is set adaptively so that wireless communication can constantly be carried out satisfactorily.

Since the power control information multiplexed and simultaneously transmitted are spread by individual codes at every terminal station and then transmitted, each terminal station can receive only its own power control information by despreading the received signal with the code allocated thereto, and hence each terminal station can receive power control information properly.

In the above transmission processing, although the power control information transmitted from the base station to the respective terminal stations are multiplexed and then simultaneously transmitted to all terminal stations, the transmission processing of the power control information is constantly the same processing so that all terminal stations which communicate with the base station cannot always receive power control information satisfactorily. Specifically, with respect to data transmitted during the data interval of each slot period, one slot is allocated to one terminal station so that the coding ratio and the modulation system suitable for such terminal station can be set. However, since power control information should be transmitted to respective terminal stations simultaneously, it is difficult to change the signal processing at every information transmitted to individual terminal stations.

Accordingly, while a terminal station located close to the base station, for example, can satisfactorily receive the power control information, it is frequently observed that a terminal station existing at the peripheral portion of a service area comprised of base stations is poor in reception situation of power control information. In particular, if one base station communicates with a large number of terminal stations at the same time, then a lot of power control information should be multiplexed and transmission electric powers of individual power control information are lowered unavoidably. As a consequence, the situation under which the terminal station existing at the peripheral portion of the service area receives power control information is degraded considerably.

SUMMARY OF THE INVENTION

The thin portion 11e is almost along a circle centering on the symmetrical point of the central hole 11c. In view of the aforesaid aspect, it is an object of the present invention to provide a communication system, a communication method and a communication apparatus in which information such as power control information that should be individually instructed to respective terminal stations can satisfactorily be transmitted to all terminal stations by a simple arrangement and simple processing.

According to an aspect of the present invention, there is provided a communication system in which a base station and a plurality of terminal stations communicate with each other. This communication system is comprised of a base station, the base station comprising data processing means for individually and adaptively setting processing of data transmitted to respective terminal stations based on communication situations with the respective terminal stations, power control information processing means for individually and adaptively setting and multiplexing transmission energyof power control information for instructing transmission electric powers of the respective terminal stations based on communication situations with respective terminal stations and transmission processing means for multiplexing and transmitting a signal processed by the data processing means and a signal processed by the power control information processing means, each of said terminal stations, each of said terminal stations comprising measuring means for measuring a reception situation of a signal transmitted from the base station and transmission processing means for transmitting information of a reception situation measured by the measuring means at an electric power set based on power control information transmitted from the transmission processing means of the base station.

According to another aspect of the present invention, there is provided a communication method in which a base station and a plurality of terminal stations communicate with each other. This communication method is comprised of the steps of generating power control information for each terminal station for instructing electric power of a signal transmitted to said base station, adaptively setting transmission energy of said power control information for individual terminal stations, multiplexing said adaptively energy set power control information to generate a multiplexed power control information and transmitting the multiplexed power control information from the base station to the plurality of terminal stations.

In accordance with a further aspect of the present invention, there is provided a communication apparatus for communicating with a plurality of terminal stations by radio. This communication apparatus is comprised of data processing means for individually and adaptively setting processing of data transmitted to said respective terminal stations based on communication situations with said respective terminal stations, power control information processing means for individually and adaptively setting and multiplexing transmission energy of power control information for instructing transmission electric power of said respective terminal stations based on communication situations with respective terminal stations; and transmission processing means for multiplexing and transmitting a signal processed by said data processing means and a signal processed by said power control information processing means.

According to the present invention, transmission energy of power control information can be set adaptively at every terminal station and each terminal station becomes able to satisfactorily receive power control information transmitted thereto.

BRIEF DESCRIPTION OF THE DRAWINGS

FIGS. 1A to 1C are explanatory diagrams showing an example of a frame format of a down-link from a base station to terminal stations and an example of an electric power distribution according to the related art, respectively;

FIG. 7 (formed of FIGS. 7A and 7B drawn on two sheets of drawings so as to permit a use of a suitably large scale) is a block diagram showing an example of an overall arrangement of a transmission system according to a second embodiment of the present invention;

DESCRIPTION OF THE PREFERRED EMBODIMENTS

Figure 2A:
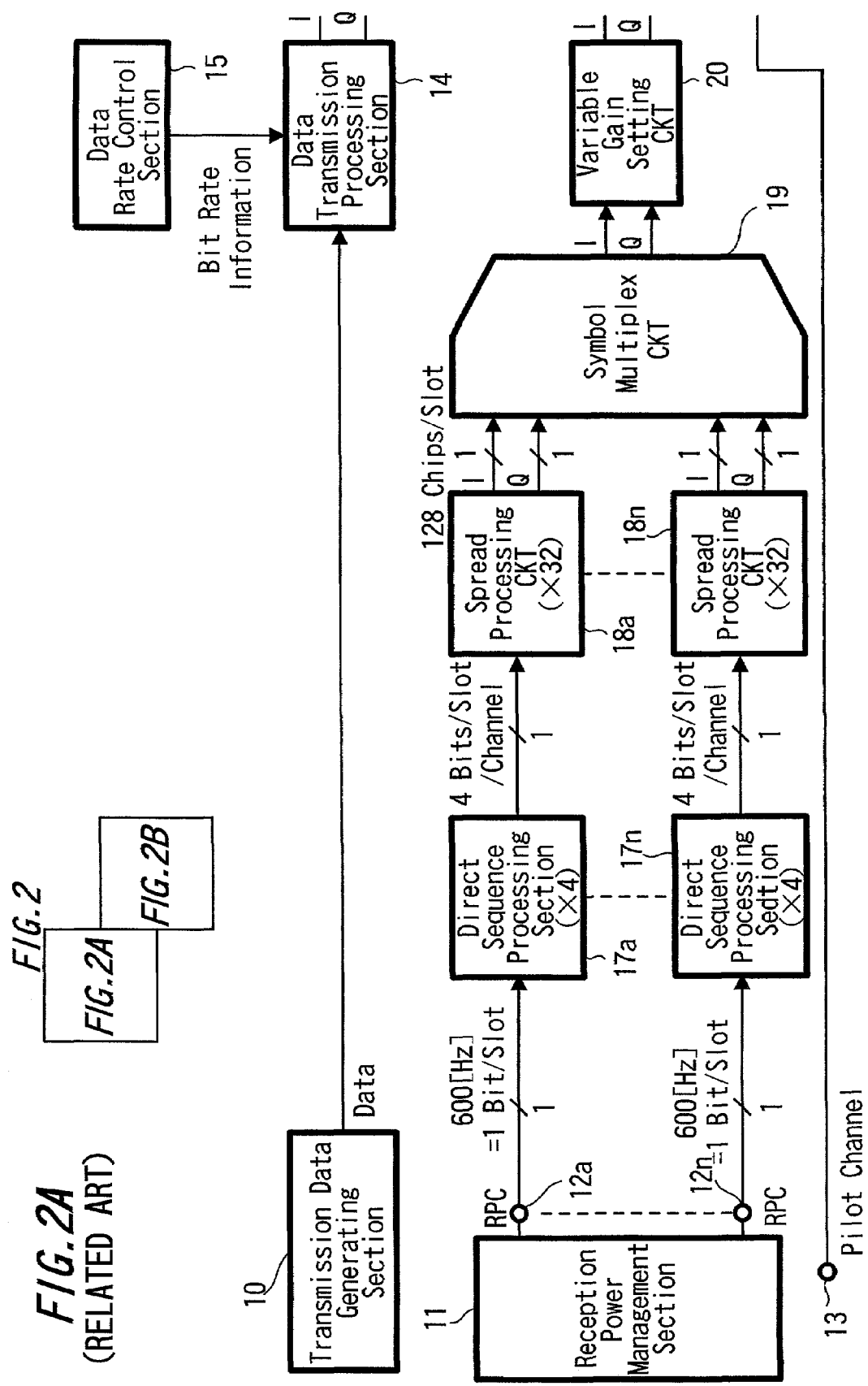
FIG. 2 (formed of FIGS. 2A and 2B drawn on two sheets of drawings so as to permit a use of a suitably large-scale) is a block diagram showing an example of an entire arrangement of a transmission system of a base station according to the related art.

A communication system, a communication method and a communication apparatus according to a first embodiment of the present invention will be described below with reference to FIGS. 3 to 6. In FIGS. 3 to 6, elements and parts identical to those of FIGS. 1A to 1C and FIG. 2 of the related art are identified with identical reference numerals.

In this embodiment, the present invention is applied to a communication system in which a CDMA system wireless signal is transmitted between the base station and a plurality of terminal stations in a bidirectional fashion. A fundamental slot arrangement used when a down-link signal is transmitted from the base station to each terminal station is the same as that shown in FIG. 1B as the example of the related art. Specifically, under the condition that the down-link transmission from the base station to each terminal station is based on a TDMA (time division multiple access) system with the frame arrangement shown in FIG. 1A and in which one slot is allocated to one terminal station, the power control information transmission interval is applied to an HDR (high data rate) system in which signals to a plurality of terminal stations and which had been spread by using different spread codes for every terminal are multiplexed. In the case of this embodiment, the transmission processing of the power control information within the power control information transmission interval is executed by processings different from those of the related art.

Figure 3B:
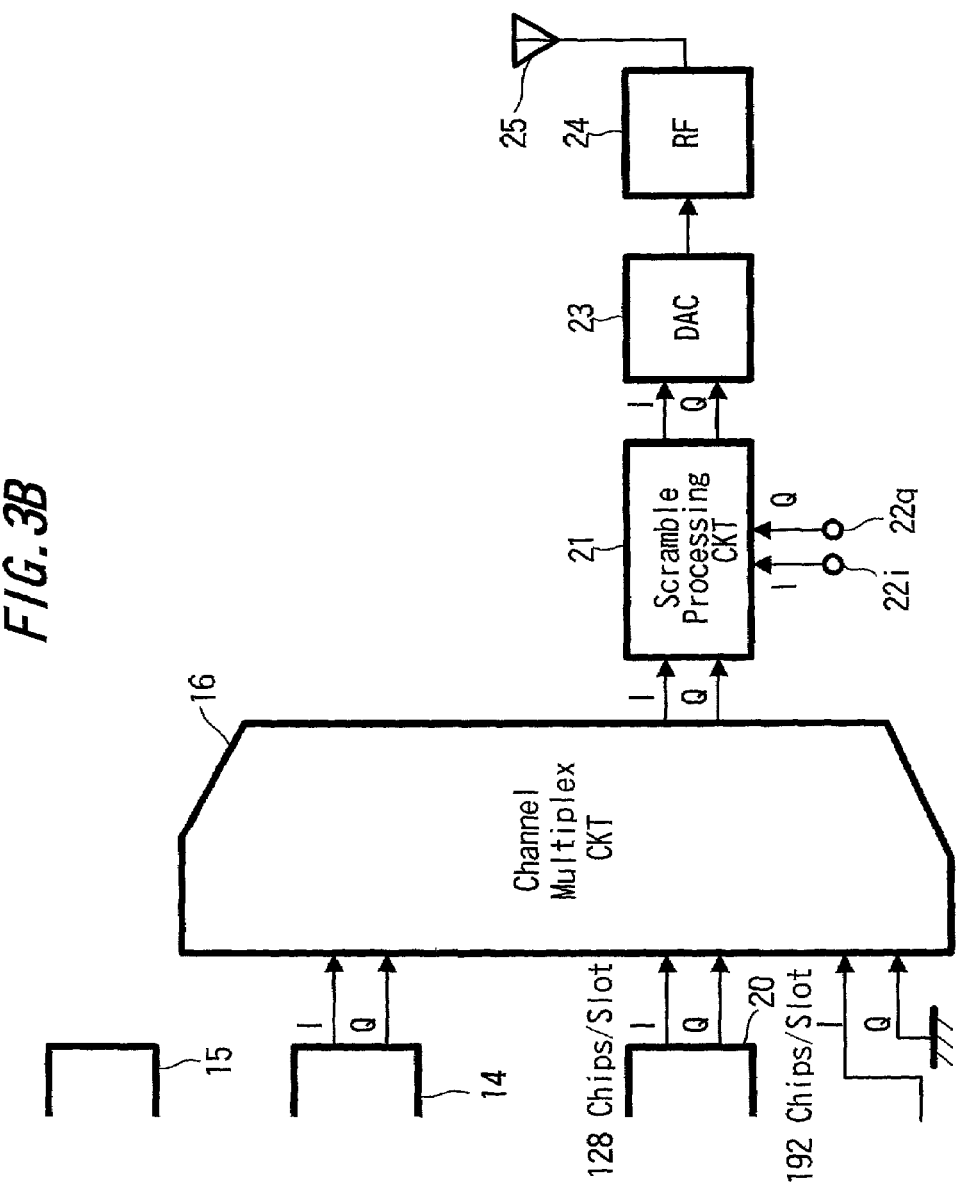
FIG. 3 (formed of FIGS. 3A and 3B drawn on two sheets of drawings so as to permit a use of a suitably large-scale) is a block diagram showing an example of an overall arrangement of a transmission system according to a first embodiment of the present invention.

FIG. 3 (formed of FIGS. 3A and 3B drawn on two sheets of drawings so as to permit a use of a suitably large-scale) is a block diagram showing an example of an arrangement of a transmission system of a base station according to this embodiment.

As shown in FIG. 3, transmission data outputted from the transmission data generating section 10 is supplied to the data transmission processing section 14, in which it is processed in a transmission processing fashion such as a coding processing, a modulation processing and an interleave processing. In this processing, the coding rate, the modulation system and the number in which data is repeated and the like are set adaptively based on the bit rate information supplied from the data rate control section 15 to the data transmission processing section 14. This data rate control section 15 is adapted to generate bit rate information based on information concerning a communication state transmitted from a terminal station, for example. Information concerning communication states transmitted from individual terminal stations are those which result from converting the reception state (a level difference called a CIR between a received electric power of a desired wave and a received electric power of an interference wave) of the signal into absolute values based on a predetermined conversion table. The following table 1 indicates an example of a relationship among coding rates, modulation systems and the number of repeated data which are set when the data transmission processing section 14 transmits data to the corresponding terminal station based on the information concerning the communication state. The table 1 sets 11 stages of the communication states and shows examples of data rates.

TABLE 1

| Value of communication state | Measured CIR value | Coding rate | Modulation system | Number of repetitions | Data rate |
|---|---|---|---|---|---|
| 0 | CIR< −7 [dB] | 1/4 | QPSK | 16 | 0.03125 [bit/symbol] |
| 1 | CIR< −7 [dB] < −8 [dB] | 1/4 | QPSK | 8 | 0.0625 [bit/symbol] |
| 2 | CIR< −6 [dB] < −4 [dB] | 1/4 | QPSK | 6 | 0.0833 [bit/symbol] |
| 3 | CIR< −4 [dB] < −3 [dB] | 1/4 | QPSK | 4 | 0.1250 [bit/symbol] |
| 4 | CIR< −3 [dB] < −2 [dB] | 1/4 | QPSK | 3 | 0.1667 [bit/symbol] |
| 5 | −2 [dB]<CIR < −1 [dB] | 1/4 | QPSK | 2 | 0.2500 [bit/symbol] |
| 6 | 1 [dB]<CIR < 3 [dB] | 1/4 | QPSK | 1 | 0.5000 [bit/symbol] |
| 7 | 3 [dB]<CIR < 5 [dB] | 3/8 | QPSK | 1 | 0.7500 [bit/symbol] |
| 8 | 5 [dB]<CIR < 9 [dB] | 1/2 | QPSK | 1 | 1.0000 [bit/symbol] |
| 9 | 9 [dB]<CIR < 12 [dB] | 1/2 | 8PSK | 1 | 1.5000 [bit/symbol] |
| 10 | 12 [dB]<CIR | 1/2 | 16QAM | 1 | 2.0000 [bit/symbol] |

In this manner, the data rates are adaptively set in response to the communication states with the respective terminal stations. Then, the transmission data (data of I-channel and data of Q-channel) processed by the data transmission processing section 14 are supplied to the channel multiplex circuit 16.

Power control information supplied from the receiving power management section 11 to the power control information input terminals 12a to 12n are information individually prepared to a plurality of terminal stations which the base station communicates at the same period. For every terminal station, individual information are separately supplied to the input terminals 12a to 12n. Power control information to one terminal station is information of one bit per slot. Such one-bit information is used to instruct the corresponding terminal station such that the corresponding terminal station increases the transmission electric power or decreases the transmission electric power.

Respective power control information applied to the input terminals 12a to 12n are respectively supplied to power control circuits 31a to 31n and thereby converted into multivalued signals. FIG. 3 shows the case in which respective power control information are converted by the power control circuits 31a to 31n into 2-bit information (2-bit parallel data) per slot in which transmission energy setting bit is added. This transmission energy setting bit is generated based on the bit rate information supplied from the data rate control section 15. To be concrete, when a transmission setting bit rate to the destination terminal station of information handled by the power control circuit of the system is higher than a reference rate, a bit for setting low transmission energy is added to the power control information based on the bit rate information from the data rate control section 15, for example. When on the other hand a transmission setting bit rate to the destination terminal station of information handled by the power control circuit of the system is lower than the reference rate, a bit for setting high transmission energy is added to the power control information.

The power control information with transmission energy setting bits added by the respective power control circuits 31*a* to 31*n* are respectively supplied to direct sequence processing sections 32*a* to 32*n*, in which they are converted into data of 4 times in which the same information is repeated 4 times per slot. The power control information that had been converted into the data of 4 times by the respective direct sequence processing sections 32*a* to 32*n* are respectively supplied to separate spread processing circuits 33*a* to 33*n*, in which they are spread and modulated into data of predetermined times (32 times) by using a predetermined code (e.g., Walsh Code) set at every terminal station and thereby power control information of I-channel and Q-channel are obtained.

The data that had been spread and modulated by the respective spread processing circuits 33*a* to 33*n* are supplied to a symbol multiplex circuit 34, in which they are mixed as signals of one system. As a mixing processing executed at that time, the mixing states are adaptively set based on transmission energy setting bit information. To be concrete, based on the transmission energy setting bit, there are changed a mixing ratio of power control information instructed so as to set a low transmission energy and a mixing ratio instructed so as to set a high transmission energy. Here, the mixing ratio is such one obtained from a signal electric power (amplitude) standpoint.

Figures 4A, 4B:
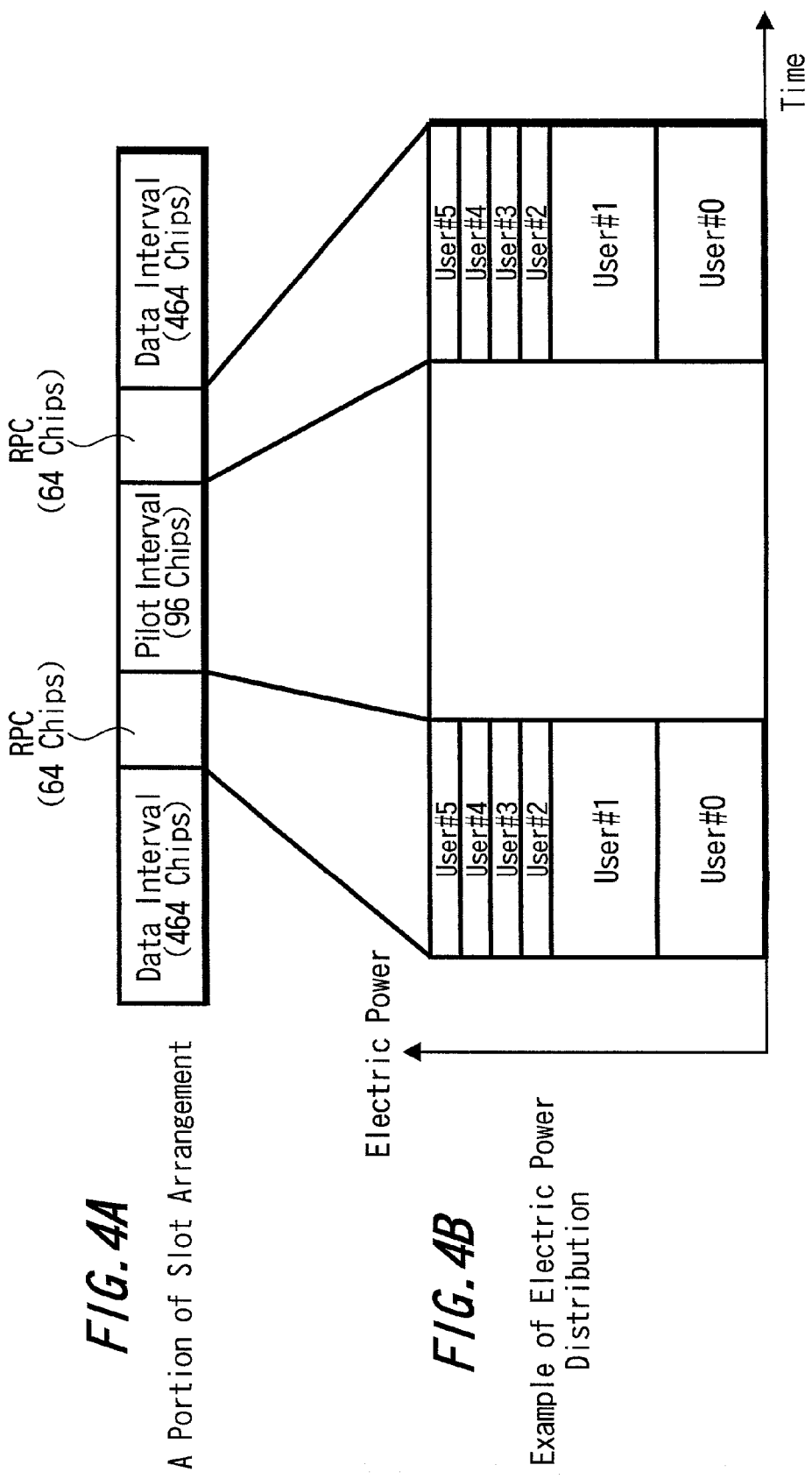
FIGS. 4A and 4B are explanatory diagrams showing an example of a part of a slot arrangement and an example of an electric power distribution according to the first embodiment of the present invention, respectively.

FIGS. 4A and 4B are respectively diagrams showing examples in which mixing ratios of power control information are set. As shown in FIG. 4A, it is assumed that first and second power control information intervals (RPC) are located ahead of and behind the second pilot interval. Respective data intervals are assumed to be 464 chips, a pilot interval is assumed to be 96 chips, and the first and second power control information intervals are respectively assumed to be 64 chips.

Let it be assumed that power control information should simultaneously be transmitted to six terminal stations of users #0 to #5 in the power control information interval, data to the users #0 and #1 are power control information instructed so as to set a high transmission energy and data to the remaining users #2 to #5 are power control information instructed to set a low transmission energy. At that time, as shown in FIG. 4B, power control information of the users #0, #1 are mixed in such a manner that they become a signal electric power about twice as large as those of the power control information to other users #2 to #5. When it is instructed that all mixed power control information are mixed with a low mixing ratio or with a high mixing ratio, as a result, the mixing ratios of information become equal to each other.

Referring back to FIG. 3, the power control information mixed to the signal of one system by the symbol multiplex circuit 34 as described above are supplied to the variable gain setting circuit 20. The variable gain setting circuit 20 adjusts the mixed power control information such that the total gain of the mixed power control information becomes substantially a constant value. Specifically, in the case of this embodiment, the gain of the signal transmitted from the base station is a previously-determined constant value and the variable gain setting circuit 20 adjusts the gain in such a manner that the output from the symbol multiplex circuit 34 may become a constant electric power. Since the gain adjustment is effected on the mixed power control information, mixing ratios (electric power ratios) of amplitudes of power control information to respective users are still those set when power control information are mixed by the symbol multiplex circuit 34. The signal whose gain had been adjusted by this variable gain setting circuit 20 is supplied to the channel multiplex circuit 16.

Pilot data applied to the pilot channel input terminal 13 are all null data and therefore supplied to the channel multiplex circuit 16 as they are.

The channel multiplex circuit 16 multiplexes supplied signals in a time-division manner such that a previously-determined slot arrangement (slot arrangement shown in FIG. 1B) may be obtained. The power control information supplied from the variable gain setting circuit 20 is multiplexed in such a manner that data of each slot unit is divided into data of first half and data of second half and the data of first half is located in the first power control information interval and the data of the second half is located in the second power control information interval.

The signals thus multiplexed by the channel multiplex circuit 16 in a time-division manner are supplied to the scramble processing circuit 21. This scramble processing circuit 21 is supplied with the spread codes of I-channel and Q-channel set for this base station from the terminals 22*i*, 22*q* and spreads the transmission signals by using these spread codes. The transmission signals of the I-channel and Q-channel are supplied to the digital-to-analog (D/A) converter 23, in which they are converted into an analog transmission signal. The analog transmission signal from the D/A converter 23 is supplied to the high-frequency (RF) circuit 24, in which it is converted into a channel signal having a predetermined transmission frequency by a high-frequency signal processing. The converted signal having the above transmission frequency is transmitted from the antenna 25 by radio and thereby transmitted to each terminal station within the area by radio.

Figure 5:
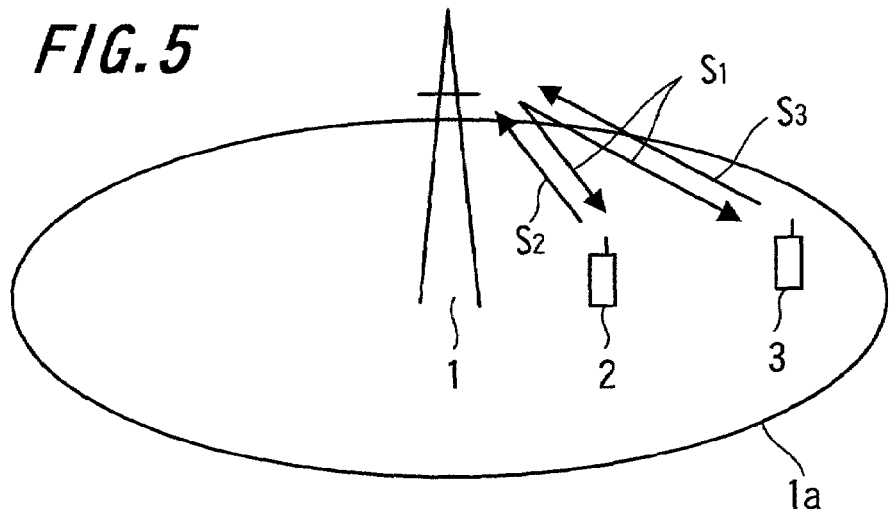
FIG. 5 is an explanatory diagram showing an example of a transmission state according to the first embodiment of the present invention.

Next, an example of a transmission state between the base station with the above arrangement and each terminal station will be described with reference to FIG. 5. Let it be assumed that a service area 1*a* in which a base station 1 communicates with terminal stations by radio is set as shown in FIG. 5. Then, terminal stations 2, 3 and the base station 1 existing within this area 1*a* are communicating with each other by radio. The terminal stations 2, 3 which had received a down-link signal S1 from the base station 1 measure the receiving situations. For example, the terminal stations 2, 3 judge the receiving states by measuring a received electric field strength and an error rate of received data. The respective terminal stations 2, 3 add data of judged reception states to up-link signals S2, S3 which are to be transmitted to the base station 1.

When receiving the up-link signals S2, S3 from the respective terminal stations 2, 3, the base station 1 sets the transmission processing state of the signal S1 transmitted from the base station 1 on the basis of the data of the reception states contained in the received signals S2, S3, i.e., "values of communication states" on the table 1 and the situations under which the base station 1 is receiving the signals S2, S3. To be concrete, "Values of communication state"=8 is transmitted as the data of the signal S1 reception state at the terminal 2 which is close to the base station 1 so that the reception state better than the reference level is judged. With respect to the reception situation under which the base station 1 is receiving the signal S2 from the terminal station 2, the satisfactory reception state is judged. At that time, the base station 1 sets the coding rate and the modulation system in response to the communication state=8 on the table 1 as the processing in which the data transmission processing section 14 processes data transmitted to the terminal station 2. With respect to the power control information multiplexed to the power control information interval and which is transmitted to the terminal station 2, a mixing ratio at the symbol multiplex circuit 34 is set to be low.

Then, "values of communication state=1" is transmitted as data indicative of the state in which the terminal station 3 distant from the base station 1 and which exists at the peripheral portion of the area 1a is receiving the signal S1 so that the situation in which the base station 1 is receiving the signal S3 from the terminal station 3 is judged as the poor reception state. At that time, the base station 1 sets the coding rate and the modulation system in response to the communication state=1 on the table 1 as the processing in which the data transmission processing section 14 processes the data transmitted to the terminal station 3. With respect to the power control information multiplexed to the power control information interval and which is transmitted to the terminal station 3, its mixing ratio at the symbol multiplex circuit 34 is set to be high.

In this manner, the power control information are transmitted to the respective terminal stations 2, 3, whereby the respective terminal stations 2, 3 can receive power control information satisfactorily. Accordingly, the respective terminal stations 2, 3 can correctly judge the contents of the power control information wherever the respective terminal stations 2, 3 are located in the service area 1a and can correctly set the transmission electric power as they are instructed from the base station 1.

Data of power control information is 1-bit data for increasing or decreasing a transmission electric power, and is set based on whether an electric power at which the base station 1 receives the signals S2, S3 is higher than or lower than the reference level. When receiving their own power control information, the respective terminal stations 2, 3 execute the processing for changing the transmission electric power to the state instructed by that power control information (i.e., increasing or decreasing a transmission electric power). When the power control information is transmitted from the base station 1 to the terminal stations 2, 3, the base station 1 can receive the signal at the receiving electric power of substantially constant level regardless of the position at which the signal is transmitted within the service area 1a. Thus, the base station can avoid the reception level from being fluctuated due to a distance between the base station and the terminal station.

While the transmission electric power of the power control information is controlled in two stages as described above, according to this embodiment, information concerning the communication state are obtained from the terminal station in the form of information of 11 stages so that the transmission electric power (amplitude) of the control information may be more finely controlled (converted into multivalued data). Examples of such control are illustrated on the following table 2. An example 1 on this table 2 shows an example of control of 2 stages of the amplitude (electric power) (i.e., control corresponding to the processing at the above embodiment), and examples 2 to 5 show controls of 11 stages.

In the case of the examples 2 and 3, Outputs of the power control circuits 31a to 31n should be 8-bit data. In the case of the examples 4 and 5, outputs of the power control circuits 31a to 31n should be 6-bit data, respectively.

TABLE 2

| Value of communication state | Reported data rate | Absolute amplitude information Example 1 | value of power Example 2 | Example 3 | Example 4 | Example 5 |
| --- | --- | --- | --- | --- | --- | --- |
| 0 | 0.03125 [bit/symbol] | 2 | 127 | 127 | 31 | 31 |
| 1 | 0.0625 [bit/symbol] | 2 | 90 | 90 | 22 | 22 |
| 2 | 0.0833 [bit/symbol] | 2 | 78 | 78 | 20 | 20 |
| 3 | 0.1250 [bit/symbol] | 2 | 64 | 64 | 16 | 16 |
| 4 | 0.1667 [bit/symbol] | 2 | 55 | 55 | 14 | 14 |
| 5 | 0.02500 [bit/symbol] | 1 | 45 | 45 | 12 | 12 |
| 6 | 0.5000 [bit/symbol] | 1 | 32 | 32 | 8 | 8 |
| 7 | 0.7500 [bit/symbol] | 1 | 26 | 26 | 7 | 7 |
| 8 | 1.000 [bit/symbol] | 1 | 23 | 20 | 6 | 5 |
| 9 | 1.5000 [bit/symbol] | 1 | 19 | 13 | 5 | 4 |
| 10 | 2.0000 [bit/symbol] | 1 | 16 | 10 | 4 | 3 |

When the transmission electric power of the power control information is controlled finely as described above, the power control information can transmitted to each terminal station more satisfactorily. In the case of the example 1 shown on the table 2, since the step of the transmission electric power control is 6 [dB], the multivalued signals can easily be generated from the power control circuits 31a to 31n by shifting the bits. The values of the amplitudes shown on the table 2 show examples of relative ratios between the reported data rates. Values substantially similar to the ratios shown on the table 2 are suitable values and are not limited to the values shown on the table 2.

While a concrete arrangement of a terminal station which communicates with the base station by radio has not been described in particular, the terminal station may be formed as a general communication apparatus to which a communication system according to this embodiment is applied.

Figure 6:
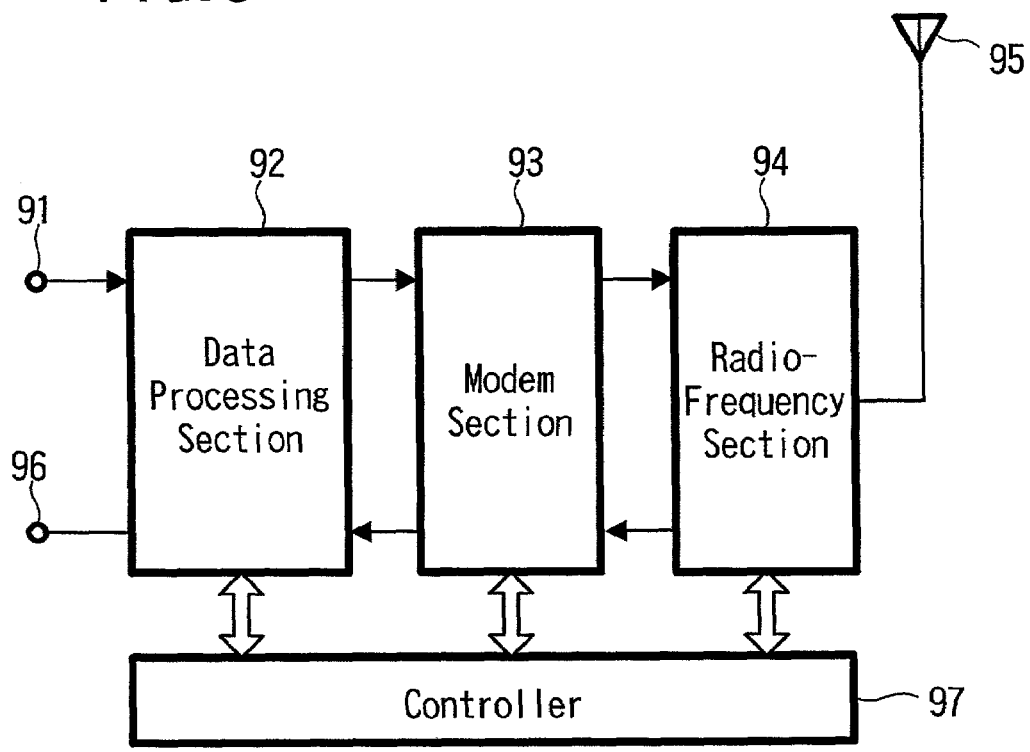
FIG. 6 is a schematic block diagram showing an example of an arrangement of a terminal station according to the first embodiment of the present invention.

Specifically, as shown in FIG. 6, for example, the arrangement of the transmission system of the terminal station will be described first. As shown in FIG. 6, transmission data applied to an input terminal 91 is supplied to a data processing section 92, in which it is converted into data of transmission slot arrangement. Then, the data of the transmission slot arrangement is supplied to a modem (modulator and demodulator) section 93, in which it is modulated into transmission modulated data. This transmission modulated data is supplied to a radio-frequency (high-frequency) section 94, in which it is frequency-converted into a signal of a predetermined transmission channel and transmitted from an antenna 95 by radio.

An arrangement of a receiving system of the terminal station will be described next. A signal of a predetermined transmission channel is received at the antenna 95 connected to the radio-frequency section 94. Then, the received signal is modulated by the modem section 93 and supplied to the data processing section 92, in which data is extracted from reception slot obtained by the modulation and the extracted data is outputted from an output terminal 96. A data processing apparatus such as a personal computer is connected to the input terminal 91 and the output terminal 96. Data processing at the data processing section 92, the modulation and demodulation processing at the modem section 93 and the high-frequency processing at the radio-frequency section 94 are executed under control of a controller 97.

With the above arrangement of the terminal station, the judgment of the receiving situation of the down-link signal is executed by the controller 97 when the controller 97 judges the reception electric power at the radio-frequency section 94, the data error rate at the data processing section 92, or the like. The data of the judged receiving situation is added to transmission data processed by the data processing section 92. The power control information transmitted from the base station is extracted by the data processing section 92 and supplied to the controller 97, and the controller 97 sets a corresponding transmission electric power by controlling an amplification factor of an amplifier provided within the radio-frequency section 94, or the like.

Figure 8A:
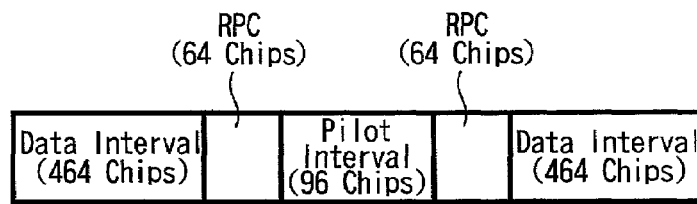
FIGS. 8A and 8B are explanatory diagrams showing an example of a part of a slot arrangement and an example of an electric power distribution according to the second embodiment of the present invention, respectively.
Figure 8B:
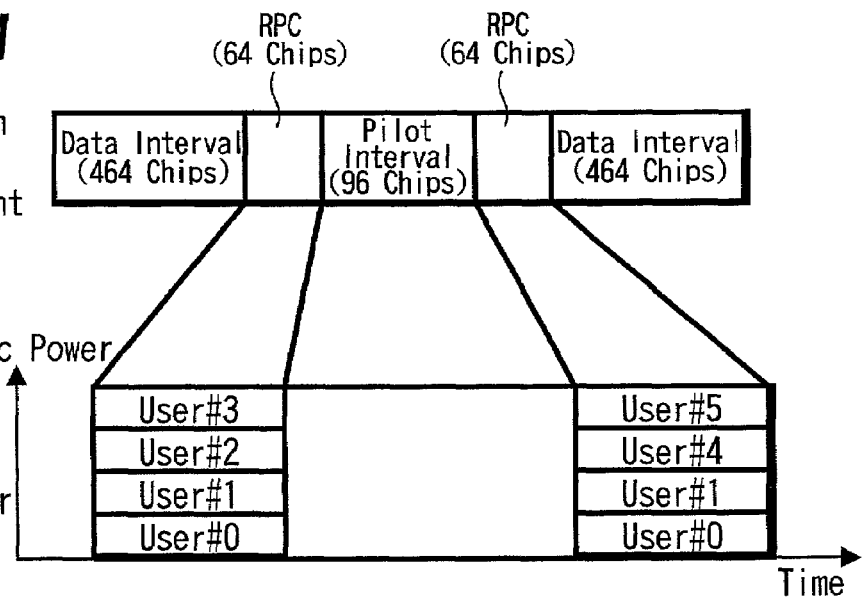

Next, a second embodiment according to the present invention will be described with reference to FIG. 7 and FIGS. 8A and 8B. In FIG. 7 and FIGS. 8A and 8B, elements and part identical to those of FIGS. 1A to 1C and FIG. 2 of the related-art and FIG. 3 and FIGS. 4A and 4B are marked with identical reference numerals.

Also in this embodiment, similarly to the first embodiment, the present invention is applied to a communication system in which a CDMA system radio signal is transmitted between a base station and a plurality of terminal stations in a bidirectional fashion. A fundamental slot arrangement used when a down-link signal is transmitted from the base station to respective terminal stations is the same as that shown in FIG. 1B in the related art. In the case of this example, the power control information transmission processing is executed by a format different from that of the first embodiment during the power control information transmission interval.

Figure 2B:
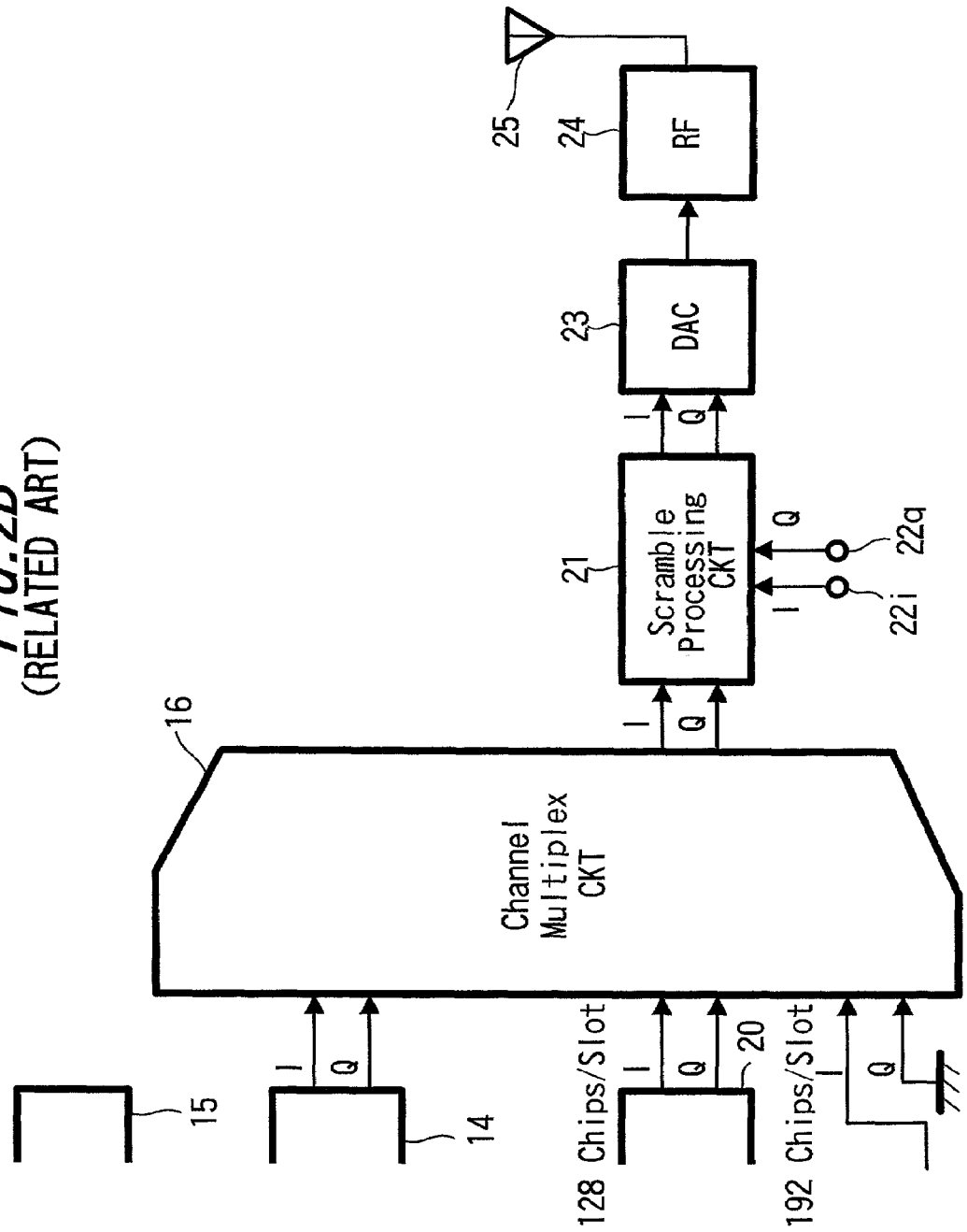

FIG. 7 (formed of FIGS. 7A and 7B drawn on two sheets of drawings so as to permit a use of a suitably large-scale) is a block diagram showing an example of an arrangement of a transmission system of a base station according to this embodiment. Also in FIG. 7, elements and parts identical to those of FIGS. 2 and 3 are marked with identical reference numerals. As shown in FIG. 7, data outputted from the transmission data generating section 10 is supplied to the data transmission processing section 14, in which it is processed by a processing for transmission such as coding processing, modulation processing and interleave processing for transmission. As the processing executed herein, there are adaptively set the coding ratio and the modulation system on the basis of the bit rate information supplied from the data rate control section 15 to the data transmission processing section 14. Transmission data (I-channel data and Q-channel data) processed by the data transmission processing section 14 are supplied to the channel multiplex circuit 16.

Power control information supplied from the reception power management section 11 to the power control information input terminals 12a to 12n are information individually prepared at every plurality of terminal station which the base station communicates at the same period. Power control information for one terminal station is information of one bit per slot. The 1-bit information is used to instruct a corresponding terminal station to increase a transmission electric power or decrease a transmission electric power.

Respective power control information applied to the input terminals 12a to 12n are respectively supplied to separate direct sequence processing sections 17a to 17n, in which they are converted into data of four times in which the same information is repeated four times per slot. The power control information converted into data of four times by the respective direct sequence processing sections 17a to 17n are respectively supplied to separate switch circuits 42a to 42n. The respective switch circuits 42a to 42n are circuits which are used to control a period during which inputted data is outputted based on control data supplied from a scheduler 41.

An example of concrete processing will be described. In the case of this embodiment, while the data supplied from the direct sequence processing sections 17a to 17n are those in which the same data is repeated four times per slot, there is selected any one of three cases in which all data of data in which the same data is repeated four times are outputted, data of twice of the first half of the data in which the same data is repeated four times are outputted and data of twice of the second half are outputted. During a period in which no data is outputted from the switch circuits 42a to 42n, there may be outputted null (NULL) symbols which are 0 data.

The scheduler 41 which controls this output state sets the output states of power control information from the switch circuits 42a to 42n on the basis of the bit rate information obtained from the data rate control section 15. Specifically, if the transmission bit rate set to the terminal station to which information is transmitted and which is handled by the switch circuit of that system is higher than a reference rate, then in order to set a low transmission energy, data of twice of the first half or the second half of data repeated four times are controlled by the bit rate information obtained from the data rate control section 15. If the transmission bit rate set to the terminal station to which information is transmitted and which is handled by the switch circuit of that system is lower than the reference rate, then in order to set a high transmission energy, all data in which the same data is repeated four times are outputted.

The scheduler 41 should set a transmission timing in such a manner that the number of systems in which data of twice of the first half are outputted and the number of systems in which data of twice of the second half are outputted become equal to each other. Therefore, if the number of the system in which the rate with a high transmission bit rate is selected is an odd number, then with respect to any one of systems, all data in which the same data is repeated four times should be outputted.

Then, the outputs from the respective switch circuits 42*a* to 42*n* are respectively supplied to separate spread processing circuits 18*a* to 18*n*, in which they are spread and modulated to data of predetermined times (32 times) by using a predetermined code (e.g., Walsh Code) set at every terminal station and thereby I-channel and Q-channel power control information are obtained.

The data that had been spread and modulated by the respective spread processing circuits 18*a* to 18*n* are supplied to the symbol multiplex circuit 19, in which they are mixed as signals of one system. As a mixing processing executed at that time, the supplied signals are mixed at the same signal electric power. Then, the power control information mixed to the signal of one system by the symbol multiplex circuit 19 as described above are supplied to the variable gain setting circuit 20. The variable gain setting circuit 20 adjusts the mixed power control information such that the total gain of the mixed power control information becomes substantially a constant value. Specifically, in the case of this embodiment, the gain of the signal transmitted from the base station is a previously-determined constant value and the variable gain setting circuit 20 adjusts the gain in such a manner that the output from the symbol multiplex circuit 19 may become a constant electric power. The signal whose gain had been adjusted by this variable gain setting circuit 20 is supplied to the channel multiplex circuit 16.

Pilot data applied to the pilot channel input terminal 13 are all null data and therefore supplied to the channel multiplex circuit 16 as they are.

The channel multiplex circuit 16 multiplexes supplied signals in a time-division manner such that a previously-determined slot arrangement (slot arrangement shown in FIG. 1B) may be obtained. The power control information supplied from the variable gain setting circuit 20 is multiplexed in such a manner that data of each slot unit is divided into data of first half and data of second half and the data of first half is located in the first power control information interval and the data of the second half is located in the second power control information interval.

Then, the signals thus multiplexed by the channel multiplex circuit 16 in a time-division manner are supplied to the scramble processing circuit 21. This scramble processing circuit 21 is supplied with the spread codes of I-channel and Q-channel set for this base station from the terminals 22*i*, 22*q* and spreads the transmission signals by using these spread codes. The transmission signals of the I-channel and Q-channel are supplied to the digital-to-analog (D/A) converter 23, in which they are converted into an analog transmission signal. The analog transmission signal from the D/A converter 23 is supplied to the high-frequency (RF) circuit 24, in which it is converted into a channel signal having a predetermined transmission frequency by a high-frequency signal processing. The converted signal having the above transmission frequency is transmitted from the antenna 25 by radio and thereby transmitted to each terminal station within the area by radio.

FIGS. 8A and 8B are respectively diagrams showing examples in which mixing ratios of power control information are set. As shown in FIG. 8A, it is assumed that first and second power control information intervals (RPC) are located ahead of and behind the second pilot interval. Respective data intervals are assumed to be 464 chips, a pilot interval is assumed to be 96 chips, and the first and second power control information intervals are respectively assumed to be 64 chips.

Let it be assumed that power control information should simultaneously be transmitted to six terminal stations of users #0 to #5 in the power control information interval, data to the users #0 and #1 are power control information instructed so as to set a high transmission energy and data to the remaining users #2 to #5 are power control information instructed to set a low transmission energy. In that case, as shown in FIG. 8B, for example, power control information of the users #0, #1 are set in such a manner that they are located at both of the first power control information interval ahead of the pilot interval and the second power control information interval behind the pilot interval. The power control information transmitted to other users #2 to #5 are set in such a manner that they are located at only one of the first power control information interval and the second power control information interval.

When the power control information are transmitted in this manner, the respective terminals become able to satisfactorily receive the power control information. Specifically, in the case of this embodiment, since the time consumed to transmit power control information within one slot is changed, similarly to the case of the first embodiment, transmission energyof power control information are set adaptively, and power control information can be transmitted to the respective terminal stations by proper transmission energycorresponding to the communication states with the terminal station. Then, in the case of this embodiment, by only controlling the time consumed for transmission at the switch circuits, transmission energycan be set adaptively, and power control information can satisfactorily be transmitted by a simple arrangement.

With respect to the communication state with the base station and the terminal stations according to the second embodiment, processing similar to that of the first embodiment can be applied. Specifically, processing similar to that described with reference to FIG. 5 in the first embodiment can be applied, and the arrangement shown in FIG. 6 can be applied to that of the terminal station.

Figure 9A:
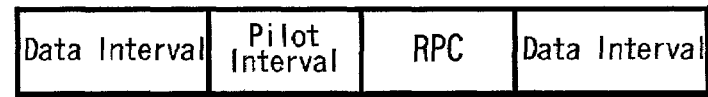
FIGS. 9A and 9B are explanatory diagrams showing an example of a part of a slot arrangement and an example of an electric power distribution according to a further embodiment of the present invention, respectively.
Figure 9B:
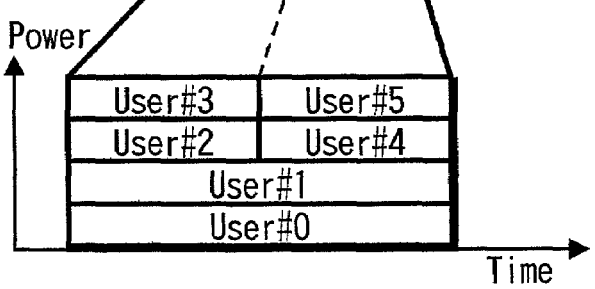

While this embodiment is applied to the slot arrangement in which the two power control information intervals are located ahead of and behind the pilot interval, the present invention is not limited thereto and can be applied to the case of other slot arrangement. For example, similar processing can be applied to the case in which only one power control information interval is located at one slot. By way of example, as shown in FIG. 9A, the power control information (RPC) is located only behind the pilot interval. Then, as shown in FIG. 9B, power control information (data of users #2 to #5) are transmitted to the terminal stations in which transmission energyare set to be low during one of the first half and the second half of the consecutive power control information interval. Power control information (data of users #0, #1) are transmitted to the terminal stations in which transmission energyare set to be high during the whole period of the consecutive power control information interval.

With the above processing shown in FIGS. 9A and 9B, similarly to the case of the above second embodiment, transmission energycan be set adaptively by controlling the time consumed for transmission of power control information. While transmission energyare changed in two stages in the example shown in FIGS. 9A and 9B, the present invention is not limited thereto, and transmission energycan be changed in more stages by more finely controlling a transmission time in actual practice.

While the present invention is applied to the processing in which power control information are individually transmitted from the base station to the respective terminal stations in the above first and second embodiments, the present invention is not limited thereto, and information that should be individually transmitted to the respective terminal stations may be transmitted by similar processing. Furthermore, when power control information is transmitted, information is not limited to simple information which instructs an increase or decrease of transmission power described in the above embodiments and may be information for making more detailed instructions.

When transmission energyof power control information are set adaptively, they may be realized by controlling of transmission electric power described in the first embodiment and processing other than the control of the transmission time described in the second embodiment. Furthermore, transmission energymay be set adaptively by a combination of the control of the transmission electric power described in the first embodiment and the control of the transmission time described in the second embodiment.

The numerical values described in the above embodiments show examples by way of example and are not limited to the above examples.

While the communication processing such as the encoding ratio, the modulation system and the number of repetitions is determined with reference to the table based on the table 1 from the values of the measured communication states (CIR values in the above example) in the processing shown on the above table 1, these communication processing states may be obtained by a calculation processing using a predetermined function from the measured communication state values. With respect to the processing shown on the table 2, while the absolute values of the amplitudes of the power control information are determined with reference to the table based on the table 2 from the reported data rates, the present invention is not limited thereto and the absolute values of the amplitudes of the power control information may be determined by a calculation processing using a predetermined function from the reported data rates.

While the coding rate, the modulation system and the number of repetition at the data transmission processing section 14 serving as the data processing means are adaptively set and processing of power control information at the power control circuits 31a to 31n and the switch circuits 42a to 42n serving as the power control information processing means is set adaptively based on the bit rate information outputted from the data control section 15 in the concrete examples of the above embodiments, the present invention is not limited thereto, and the adaptive setting at the data transmission means and the adaptive setting at the power control information processing means may be executed based on other communication state information.

While the processing described in the above embodiments is applied to the TDMA system in which one slot is allocated to one connection as the frame arrangement and the data transmission system called the HDR system in which only the power control information transmission interval within each slot is multiplexed by the CDMA system, the processing arrangement of the present invention is not limited thereto and can be applied to other transmission systems. For example, other intervals than the power control information transmission interval may be multiplexed by the CDMA system. Moreover, when signals other than the CDMA system signal are transmitted by radio, the processing arrangement according to the present invention can be applied.

According to the present invention, transmission energyof power control information are adaptively set at every terminal station, and hence the respective terminal stations can satisfactorily receive power control information of their own stations. Accordingly, with respect to the power control information, resources can be optimized and extra margins of frequency resources can be reduced. Moreover, since substantially uniform power control information can be supplied to any terminal station, uniform quality of up-link signal to the base station can be supplied to all terminal stations uniformly. According to circumstances, more channels can be accommodated by the wireless communication system.

In this case, under the condition that the transmission electric power from the base station is set to the fixed value and that the total transmission electric power of the power control information is set to the fixed value, transmission energyto individual terminal stations are set adaptively so that the transmission electric power from the base station can be made constant and the satisfactory transmission state can be maintained. Thus, individual terminal stations become able to transmit power control information satisfactorily.

In the above case, the power control information to a plurality of terminal stations are spread by using individual codes at every terminal station and the spread signals are multiplexed and transmitted, whereby the respective terminal stations can satisfactorily extract only power control information of their own stations from the power control information simultaneously transmitted. Moreover, when the power control information are transmitted in this manner, the electric power distributed to the terminal station which has a margin in reception electric power can be decreased, thereby reducing an interference electric power. As a consequence, it becomes possible to decrease errors caused by interference of power control information. Therefore, it becomes possible to provide an excellent quality of a up-link signal. Further, since the interference electric power is decreased, codes which cannot be used as margin from an interference standpoint in the related art can be allocated so that the number of channels of power control information can be increased. Also, it becomes possible to increase the number of terminal stations which can be accommodated in the wireless communication system at the same time.

In the above case, the transmission energy of power control information to the terminal station to which there is transmitted information indicating that the measured reception situation is lower than the reference level is increased and the transmission energy of power control information to the terminal station to which there is transmitted information indicating that the measured reception situation is higher than the reference level is decreased, whereby power control information set based on the adequate standard can satisfactorily be transmitted to respective terminal stations.

Further, in the above case, transmission energyare set adaptively by controlling the transmission power, whereby transmission energyat every terminal station can easily and satisfactorily be set by only properly setting the transmission power.

Furthermore, in the above case, transmission energyare set adaptively by adaptively changing the time consumed for transmission, whereby transmission energyto every terminal station can easily and satisfactorily be set only by setting the transmission time.

Having described preferred embodiments of the invention with reference to the accompanying drawings, it is to be understood that the invention is not limited to those precise embodiments and that various changes and modifications could be effected therein by one skilled in the art without departing from the spirit or scope of the invention as defined in the appended claims.

What is claimed is:

1. A communication system, comprising:
a base station having:
data processing means for individually and adaptively setting processing of data transmitted to each of a plurality of terminal stations based on communication states of each of said plurality of terminal stations;
power control information processing means for individually and adaptively setting and multiplexing a transmission energy of power control information for controlling a transmission electric power of all of said plurality of terminal stations based on communication states of said plurality of terminal stations; and
transmission processing means for multiplexing and transmitting a signal processed by said data processing means and a signal processed by said power control information processing means; wherein
each of said plurality of terminal stations have:
measuring means for measuring a reception state of a received signal transmitted from said base station; and
transmission processing means for transmitting, with a transmission electric power based on said power control information transmitted from said transmission processing means of said base station, information on said reception state measured by said measuring means,
wherein said transmission electric power transmitted by said transmission processing means of said base station is a fixed value, and said power control information processing means adaptively sets a transmission energy for each of said plurality of terminal stations based on said information on said reception state such that a total electric power of said power control information transmitted by said base station is a constant value,
and wherein transmission energy for each of said plurality of terminal stations are interdependent such that when the transmission energy for one of said plurality of terminal stations is changed, the transmission energy for the totality of the others of said plurality of terminal stations is changed as well such that the total electric power of said power control information transmitted by said base station is a constant value.

2. The communication system according to claim 1, wherein said power control information processing means of said base station spreads power control information for saidplurality of terminal stations by using individual codes for each of said plurality of terminal stations and multiplexes said spread power control information.

3. The communication system according to claim 1, wherein said power control information processing means of said base station increases said transmission energy of power control information for a terminal station that transmits information indicating that a measured value of said reception state is lower than a threshold value and decreases transmission energy of power control information for a terminal station that transmits information indicating that said measured value of said reception state is higher than said threshold value.

4. The communication system according to claim 1, wherein said power control information processing means of said base station adaptively sets said fransmission energy by controlling said transmission electric power.

5. The communication system according to claim 1, wherein said power control information processing means of said base station adaptively sets said transmission energy by adaptively changing time consumed for transmission.

6. A communication method in which a base station and a plurality of terminal stations communicate, the method comprising the steps of:
generating power control information for all of said plurality of terminal stations for instructing electric power of a signal transmitted to said base station;
adaptively setting transmission energy of said power control information for all of said plurality of terminal stations;
multiplexing adaptively set power control information having transmission power set in said step of adaptively setting to generate multiplexed power control information;
transmitting said multiplexed power control information from said base station to said plurality of terminal stations; and
fixing a total transmission electric power of said multiplexed power control information at a constant value made up of said adaptively set power control information for said plurality of terminal stations,
wherein transmission energy for each of said plurality of terminal stations are interdependent such that when the transmission energy for one of said plurality of terminal stations is changed, the transmission energy for the totality of the others of said plurality of terminal stations is changed as well such that the total electric power of said power control information transmitted by said base station is a constant value.

7. The communication method according to claim 6, wherein said power control information for said plurality of terminal stations are spread by using individual codes for said plurality of terminal stations.

8. The communication method according to claim 6, further comprising the steps of: increasing said transmission energy of power control information for a terminal station having a value of a reception state lower than a threshold value; and decreasing said transmission energy of power control information to a terminal station having a value of said reception state higher than said threshold value.

9. The communication method according to claim 6, wherein said transmission energy is adaptively set by controlling said transmission electric power.

10. The communication method according to claim 6, wherein said transmission energy is adaptively set by adaptively changing time intervals for transmission.

11. A communication apparatus at a base station for communicating with a plurality of terminal stations by radio, comprising:
data processing means for individually and adaptively setting processing of data transmitted to each of said plurality of terminal stations based on communication states with said plurality of terminal stations;
power control information processing means for individually and adaptively setting and multiplexing transmission power control information for controlling transmission electric power of each of said plurality of terminal stations based on said communication states with said plurality of terminal stations; and
transmission processing means for multiplexing and transmitting a signal processed by said data processing means and a signal processed by said power control information processing means,
wherein transmission electric power of said signal transmitted by said transmission processing means adaptively sets a transmission energy for each of said plurality of terminal stations based on said communication states and a total electric power of said power control information is set to a constant value, and wherein transmission energy for each of said plurality of terminal stations are interdependent such that when the transmission energy for one of said plurality of terminal stations is changed, the transmission energy for the totality of the others of said plurality of terminal stations is changed as well such that the total electric power of said power control information transmitted by said base station is a constant value.

12. The communication apparatus according to claim 11, wherein said power control information processing means spreads power control information, for said each of said plurality of terminal stations by using individual codes for said each of said plurality of terminal stations and multiplexes said spread power control information.

13. The communication apparatus according to claim 11, wherein said power control information processing means increases said transmission energy of power control information for a terminal station having said communication state lower than a threshold value and decreases said transmission energy of power control information for a terminal station having said communication state higher than said threshold value.

14. The communication apparatus according to claim 11, wherein said power control information processing means adaptively sets said transmission energy by controlling said transmission electric power.

15. The communication apparatus according to claim 11, wherein said power control information processing means adaptively sets transmission energy by adaptively changing time intervals for transmission.

\* \* \* \* \*

UNITED STATES PATENT AND TRADEMARK OFFICE
CERTIFICATE OF CORRECTION

PATENT NO. : 7,061,888 B2
APPLICATION NO. : 09/798624
DATED : June 13, 2006
INVENTOR(S) : Kazuyuki Sakoda It is certified that error appears in the above-identified patent and that said Letters Patent is hereby corrected as shown below:

Title Page item (57) should read --A base station and a plurality of terminal stations communicate with each other by radio, and reception states of signals transmitted from the base station are measured by respective terminal stations and measured information is transmitted to the base station. When the base station adaptively sets processing of signals transmitted to the respective terminal stations based on the transmitted information and multiplexes and transmits, from the base station to the plurality of terminal stations, power control information (RPC) for instructing electric power of signals transmitted from the respective terminal stations to the base station, transmission energy to individual terminal stations is set adaptively and transmission electric power at the respective terminal stations is set based on the power control information. Thus, information such as power control information that should be individually transmitted to each respective terminal station can satisfactorily be transmitted to all terminal stations.--

In the Specification:
Column 2, line 2, "station are" should read --station is--.
Column 2, line 11, "stations are" should read --station is--.
Column 2, line 24, "to #5 are" should read --to #5 is--.
Column 2, line 49, "stations are" should read --stations is--.
Column 3, line 24, "12n are information" should read --$12n$ is information--.
Column 3, line 25, "station communicate" should read --station communicates--.
Column 3, line 26, "are separately" should be --is separately--.
Column 3, line 28, "information are" should read --information is--.
Column 3, line 38, "$12n$ are" should read --$12n$ is--.
Column 3, line 42, "are respectively" should read --is respectively--.
Column 4, line 51, "are spread" should read --is spread--.
Column 4, line 59, "are multiplexed" should read --is multiplexed--.
Column 5, line 4, should read --the signal processing at every piece of information transmitted to individual terminal stations--.
Column 5, line 44, insert a space between "energyof".
Column 5, line 50, delete "each of said terminal stations".
Column 5, line 67, "generate a multiplexed" should read --generate multiplexed--.
Column 7, line 55, "are those which results" should read --is that which results--.
Column 8, line 36, "$12n$ are" should read --$12n$ is--.

UNITED STATES PATENT AND TRADEMARK OFFICE
CERTIFICATE OF CORRECTION

PATENT NO. : 7,061,888 B2
APPLICATION NO. : 09/798624
DATED : June 13, 2006
INVENTOR(S) : Kazuyuki Sakoda It is certified that error appears in the above-identified patent and that said Letters Patent is hereby corrected as shown below:

Column 8, line 39, "are separately" should read --is separately--.
Column 8, line 47, "$12n$ are" should read --$12n$ is--.
Column 8, line 50, "are converted" should read --is converted--.
Column 9, line 1, "are respectively" should read --is respectively--.
Column 9, line 6, "are respectively" should read --is respectively--.
Column 9, line 11, "are obtained" should read --is obtained--.
Column 9, line 42, "are mixed" should read --is mixed--.
Column 9, line 45, "are mixed" should read --is mixed--.
Column 9, line 51, "are supplied" should read --is supplied--.
Column 9, line 64, "are mixed" should read --is mixed--.
Column 11, line 19, "are transmitted" should read --is transmitted--.
Column 12, line 9, "are obtained" should read --is obtained--.
Column 12, line 19, "3, Outputs" should read --3, outputs--.
Column 13, line 44, "and part" should read --and parts--.
Column 14, line 13, "are information" should read --is information--.
Column 14, line 21, "are respectively" should read --is respectively--.
Column 14, line 27, "are respectively" should read --is respectively--.
Column 15, line 15, "are supplied" should read --is supplied--.
Column 16, line 7, "are set" should read --is set--.
Column 16, line 11, "are set" should read --is set--.
Column 16, line 15, "are transmitted" should read --is transmitted--.
Column 16, line 21, insert a space between "energyof".
Column 16, line 21, "are set" should read --is set--.
Column 16, line 24, insert a space between "energycorresponding".
Column 16, line 27, insert a space between "energycan".
Column 16, line 47, "are transmitted" should read --is transmitted--.
Column 16, line 48, insert a space between "energyare".
Column 16, line 51, "are transmitted" should read --is transmitted--.
Column 16, line 52, insert a space between "energyare".
Column 16, line 57, insert a space between "energycan".
Column 16, line 59, "energyare changed" should read --energy is changed--.
Column 16, line 61, insert a space between "energycan".
Column 16, line 65, "are individually" should read --is individually--.
Column 17, line 9, insert a space between "energyof".
Column 17, line 10, "are set" should read --is set--.
Column 17, line 14, insert a space between "energymay".
Column 17, line 19, delete "by way of example"

UNITED STATES PATENT AND TRADEMARK OFFICE
CERTIFICATE OF CORRECTION

PATENT NO. : 7,061,888 B2
APPLICATION NO. : 09/798624
DATED : June 13, 2006
INVENTOR(S) : Kazuyuki Sakoda It is certified that error appears in the above-identified patent and that said Letters Patent is hereby corrected as shown below:

Column 17, line 23, "is determined" should read --are determined--.
Column 17, line 64, insert a space between "energyof".
Column 17, line 65, "are adaptively" should read --is adaptively--.
Column 18, line 15, insert a space between "energyto".
Column 18, line 15, "are set" should read --is set--.
Column 18, line 22, "are spread" should read --is spread--.
Column 18, line 28, "are transmitted" should read --is transmitted--.
Column 18, line 35, "a up-link" should read --an up-link--.
Column 18, line 53, insert a space between "energyare".
Column 18, line 59, insert a space between "energyare".
Column 18, line 61, insert a space between "energyto".
Column 19, line 37, "are interdependent" should read --is interdependent--.
Column 19, line 47, insert a space between "saidplurality".
Column 19, line 62, "fransmission" should read --transmission--.
Column 20, line 21, "are interdependent" should read --is interdependent--.
Column 20, line 30, "are spread" should read --is spread--.
Column 21, line 2, "are interdependent" should read --is interdependent--.
Column 21, line 11, "delete the comma between "information, for".

Signed and Sealed this

Sixth Day of March, 2007

JON W. DUDAS
*Director of the United States Patent and Trademark Office*